(12) United States Patent
Calderaio

(10) Patent No.: US 6,338,252 B1
(45) Date of Patent: Jan. 15, 2002

(54) HEAT TRANSFER CONTAINER

(75) Inventor: John P. Calderaio, Doylestown, PA (US)

(73) Assignee: Smartcup International, Jupiter, FL (US)

( * ) Notice: Subject to any disclaimer, the term of this patent is extended or adjusted under 35 U.S.C. 154(b) by 0 days.

(21) Appl. No.: 09/524,547

(22) Filed: Mar. 13, 2000

(51) Int. Cl.[7] .................................................. F25D 5/00
(52) U.S. Cl. ........................................ 62/4; 126/263.08
(58) Field of Search ........................... 62/4; 126/263.05, 126/263.06, 263.07, 263.08, 263.09

(56) References Cited

U.S. PATENT DOCUMENTS

| | | | |
|---|---|---|---|
| 654,174 A | | 7/1900 | Murmann et al. |
| 1,751,387 A | | 3/1930 | Bielek |
| 2,968,932 A | * | 1/1961 | Vance et al. ........... 126/263.08 |
| 3,369,369 A | | 2/1968 | Weiss |
| 3,561,424 A | | 2/1971 | Failla |
| 3,653,372 A | | 4/1972 | Douglas |
| 3,683,889 A | | 8/1972 | Hoffman |
| 3,685,507 A | | 8/1972 | Donnelly |
| 3,871,357 A | | 3/1975 | Grosso et al. |
| 3,874,504 A | | 4/1975 | Verakas |
| 3,889,483 A | * | 6/1975 | Donnelly ............... 126/263.07 |
| 3,970,068 A | * | 7/1976 | Sato ....................... 126/263.08 |
| 4,501,259 A | | 2/1985 | Apellaniz |
| 4,741,324 A | | 5/1988 | Ina et al. |
| 4,773,389 A | * | 9/1988 | Hamasaki ........................ 62/4 |
| 4,793,323 A | | 12/1988 | Guida et al. |
| 5,035,320 A | | 7/1991 | Plone |
| 5,255,812 A | | 10/1993 | Hsu |
| 5,431,276 A | | 7/1995 | Lialin |
| 5,486,371 A | | 1/1996 | Chen |
| 5,626,022 A | | 5/1997 | Scudder et al. |
| 5,655,384 A | * | 8/1997 | Joslin, Jr. ........................ 62/4 |

* cited by examiner

*Primary Examiner*—Ronald Capossela
(74) *Attorney, Agent, or Firm*—Breiner & Breiner, L.L.C

(57) ABSTRACT

Single-use heat transfer container has an insulated product chamber containing a reaction vessel holding two separate reactants. The product chamber is partially defined by the reaction vessel which is integrally sealed thereto near a lower end of the container. The reaction vessel has a flexible bottom that is responsive to external pressure. An activation pin on the interior of the bottom is capable of piercing a barrier inside the reagent vessel when the container bottom is depressed. The resulting mixing of the separately stable reactants in the vessel initiates the desired heat transfer reaction. The container may have a cover including storage compartments for user dispensable additives. The method of making the inventive container is disclosed.

16 Claims, 2 Drawing Sheets

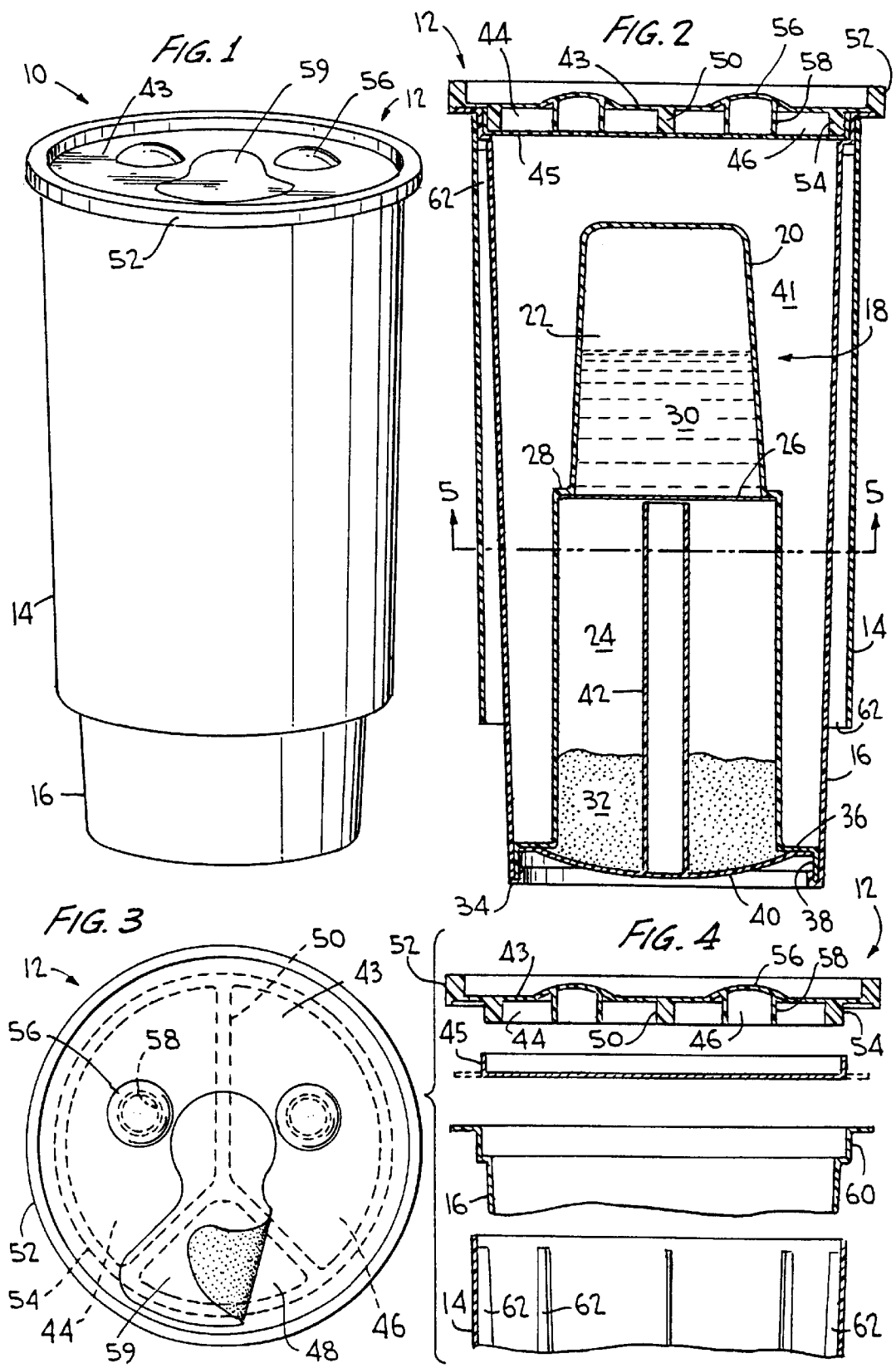

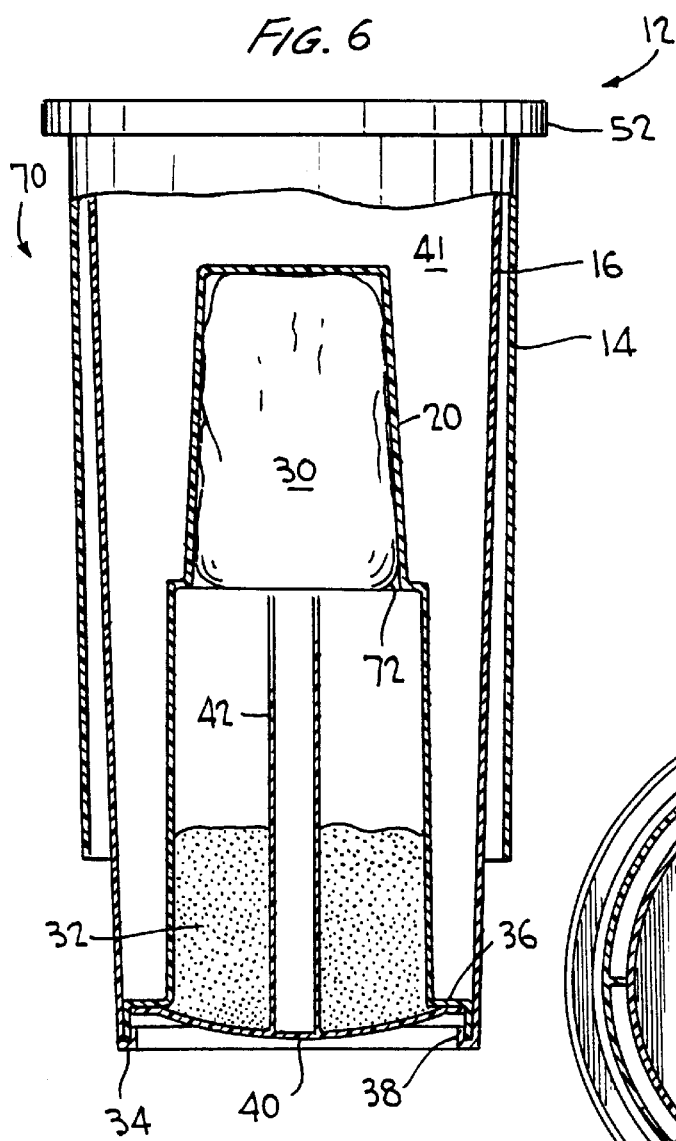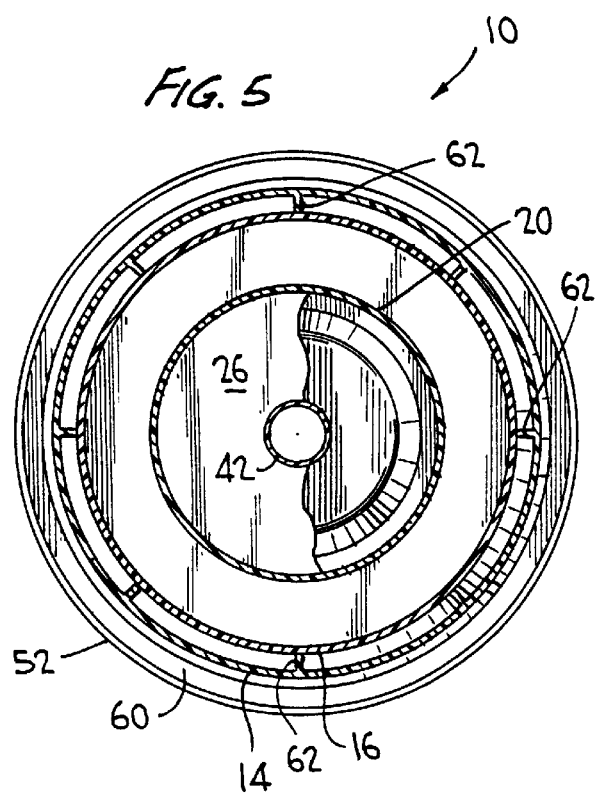

HEAT TRANSFER CONTAINER

FIELD OF THE INVENTION

The present invention relates to a heat transfer container and more particularly to a portable single-use self-heating (or cooling) container for products including food and beverages and a method of making said container.

BACKGROUND OF THE INVENTION

The present invention is primarily directed to a self-heating beverage container and method of making. It is understood, however, that the invention may also be practiced as a cooling unit and is suitable for any product, including beverages, food and the like.

It is generally known to provide a heat transfer container having a reaction cavity in heat conducting connection with the contents of the container. The reaction cavity is isolated from the contents and contains two separate chemical reactants which are individually stable and capable of an exothermic or endothermic reaction when combined within the cavity.

For example, U.S. Pat. No. 4,793,323 discloses a self-heating container, wherein a metallic product cup is suspended by its outer rim within a plastic reaction vessel. The reaction vessel is provided with a breakable barrier defining two chambers. Breaking members consisting of stems ending in projections are installed inside the reaction vessel and are capable of piercing the barrier when pushed from outside at a curved flexible bottom unitary to the reaction vessel. An outer insulating envelope surrounds the container and extends below the flexible bottom to provide a base for the container.

U.S. Pat. No. 5,626,022 discloses a container having a reaction module unitarily formed within the container. The reaction module contains a solid reactant. A liquid reactant is contained within a cap module disposed within an opening in the reaction module. The cap module has activation means which comprise an actuator disc and vertical prongs extending therefrom toward a breakable cap bottom. Initiation of a reaction, caused by combination of the reactants is achieved by depressing the actuator disc on the container cap causing the prongs within the cap to break the cap bottom releasing liquid into the reaction module.

Other heat transfer containers have a separate external barrier piercing device which must be inserted into the container's reaction cavity from outside to initiate the desired chemical combination.

The prior art also discloses container covers having means for storing user dispensable additives. U.S. Pat. No. 5,431,276 discloses a container cover having storage compartments partially defined by an external rim and a concentric inner rim disposed under a circular top. A plurality of dividers extends between the rims to form compartments between the top and a penetrable bottom barrier attached under the rims and dividers. Within each compartment is a plunger capable of penetrating the bottom barrier when pressed from above the cap.

Existing containers, however, have significant drawbacks. They often require a large number of and/or structurally complex components, making them unnecessarily expensive and difficult to manufacture. Further, they do not recognize the need for nor provide important functional ergonomic and aesthetic features. They are therefore not suited to the objects of the present invention.

It would be desirable to have a disposable heat transfer container that is functionally superior while being simple of structure and highly suitable for economical large scale manufacture. It would also be desirable to have a heat transfer unit having improved aesthetic and functional ergonomic features.

OBJECTS AND SUMMARY OF THE INVENTION

Accordingly, a primary object of the present invention is to provide an improved heat transfer container and method of making the same.

It is another object of the invention to provide an improved single-use heat transfer container.

It is another object of the invention to provide a container structure and method of making suited to economical large-scale manufacture.

It is another object of the invention to provide a container having superior heat transfer and insulating properties in combination with desirable ergonomic and aesthetic features.

These and other objects of the present invention will be apparent from the following description, particular reference being made to the drawings.

Briefly, the aforementioned and other objects of the invention are accomplished by a portable single-use heat transfer container having a product body integral with a conductive internal reaction vessel. The product body is insulated by an outer jacket which partially defines a product chamber capable of storing a product such as beverage. The reaction vessel has a flange at an open lower end that is sealed to the lower interior surface of the product body so as to define the bottom of the product chamber. A flexible bottom member is sealed to the reaction vessel enclosing the open lower end. The bottom member has a pin extending from its internal surface toward a penetrable barrier isolating two reactants inside the reaction vessel. When the flexible member is depressed from outside the container, the pin breaks the barrier to combine the reactants and initiate the desired reaction. Thereafter, the contents of the product chamber will be temperature conditioned as desired. The container preferably also has a dispensing cover with user activated compartments holding product additives. The inventive method of making the heat transfer container is disclosed in the following detailed description of the invention.

The heat transfer container and method of manufacture according to the present invention provide an until now undiscovered combination of heat transfer functionality in a very simple structure especially directed to a novel and economical method of manufacture. The features of the present invention, including the dispensing cover and the flexible bottom member, have also been invented with ease of use in mind.

BRIEF DESCRIPTION OF THE DRAWING

The foregoing summary, as well as the following detailed description of the preferred embodiments of the invention, will be better understood when read in conjunction with the appended drawings. For purposes of illustrating the invention, there are shown in the drawings embodiments which are presently preferred. It should be understood, however, that the invention is not limited to the precise arrangements and instrumentalities shown. In the drawings:

FIG. 1 is an exterior perspective view of a heat transfer container according to the present invention including a dispensing cover;

FIG. 2 is a cross-sectional view of the container of FIG. 1;

FIG. 3 is a top view of the dispensing cover shown in FIG. 1;

FIG. 4 is a broken-away exploded cross-sectional view of the container of FIG. 1;

FIG. 5 is the container of FIG. 2 viewed along line 5—5; and

FIG. 6 is a cross-sectional view of a second embodiment of a heat transfer container according to the invention.

DETAILED DESCRIPTION AND PRESENTLY PREFERRED EMBODIMENTS

Referring now to the drawings, wherein similar reference characters designate corresponding parts throughout the several views, a heat transfer container according to the present invention is generally illustrated at 10 in FIG. 1.

Referring to FIGS. 1 and 2, there is illustrated a single-use heat transfer container 10, including dispensing cover 12, insulating jacket 14, product body 16 and reaction vessel 18.

Internal reaction vessel 18 includes cylinder 20 and reactant compartments 22 and 24 separated by barrier 26. Cylinder 20 comprises a highly conductive material, preferably polytetrafluoroethylene (PTFE) coated aluminum. Cylinder 20 has shoulder 28 providing a toroidal attachment surface for barrier 26, a penetrable material such as a metal foil which is thermally welded to the cylinder. Barrier 26 preferably comprises aluminum foil coated with a heat sealable varnish to facilitate secure attachment to cylinder 20. Compartment 22 contains a first reactant 30, preferably a liquid reagent such as water, which is isolated from compartment 24 by barrier 26. Compartment 24 contains a second reactant 32, such as anhydrous calcium chloride, chosen to produce a desired reaction, known to those skilled in the art, upon combination with reactant 30.

Product body 16 is a generally cylindrical plastic body surrounded by plastic insulating jacket 14 and has rolled lower edge 34. Edge 34 receives cylinder 20, which is heat sealed to the interior surface of body 16. Thus, cylinder 20 has a flanged lower end providing a second toroidal surface 36 and a vertical outer lip 38. Lip 38 is thermally sealed to the interior surface of plastic body 16 and supported in an annular groove defined by rolled edge 34. Thereby, product chamber 41 is defined in the space between body 16 and cylinder 20.

Reaction vessel 18 includes elastic container bottom 40 thermally sealed at its perimeter to the second toroidal surface 36 of cylinder 20. Reaction vessel 18 is therefore defined by cylinder 20 in conjunction with container bottom 40. The height of lower lip 38 maintains the curved outer surface of bottom 40 in suspension above lower edge 34 such that the weight of container 10 is fully supported by body 16 at edge 34. Bottom 40 preferably comprises a flexible plastic material.

Integral to bottom 40 is cylindrical activation pin 42 extending vertically within compartment 24 and nearly contacting barrier 26. As described in further detail below, pin 42 is capable of piercing barrier 26 to initiate the desired chemical reaction necessary for a heat transfer effect.

Referring now to FIGS. 3 and 4, there is shown plastic dispensing cover 12 and a broken-away exploded view of cover 12, body 16 and jacket 14. Container 10 may include any suitable cover, preferably an additive dispensing cover, as illustrated by 12 in the drawing. Cover 12 has top 43, two separate individually activated additive compartments 44 and 46 and an opening 48 separated by an appropriate set of dividers 50 on the interior surface of top 43. Compartments 44 and 46 are further defined by foil 45, which preferably comprises a varnish coated aluminum foil. As shown in FIG. 4, cover 12 has raised outer rim 52 which is also rolled downward at its periphery. Inner rim 54 defines the outer edge of compartments 44 and 46 and has foil 45 heat sealed to its lower edge and about its outer vertical surface. Foil 45 is further sealed to the lower edge of the dividers 50.

The dispensing function of cover 12 is activated for compartment 44 at raised button 56 on top 43 of cover 12 in conjunction with internal cover pin 58. Button 56 can be individually depressed with concomitant movement of pin 58 to pierce foil 45 causing release of the additive from the compartment. Compartment 46 is similarly operated. A removable adhesive foil tab 59 is provided on the exterior of top 43 to seal opening 48 prior to use. Cover 12 is useful for storing any desirable additives such as cream or sugar in the case of a coffee container. Moreover, it allows user determined amounts to be added when the separate compartments contain volumes of the same material. It should be observed that buttons 56 are easily located by sense of touch due to their raised profile and therefore can be activated without the user's full attention. Similarly, tab 59 can easily be removed without looking at container 10.

Referring to FIGS. 2 and 4, it is seen that cover 12 is attached to container body 16. Inner rim 54 and outer rim 52 form a groove that is heat sealed to stepped shoulder 60 of body 16 with foil 45 sandwiched in between. Insulating outer jacket 14 is in turn affixed to container body 16 at the exterior of shoulder 60 and along its exterior at vertically running radiating ribs 62. Jacket 14 preferably does not extend completely to the lower end of body 16. This allows convenient use of cup holders such as those found in automobiles.

Referring now to FIG. 5, container 10 is illustrated as viewed along line 5—5 in FIG. 2, showing its concentric structural features. Outer rim 52 of cover 12 surrounds shoulder 60 of body 16 to which jacket 14 is attached. Within jacket 14 is material body 16, separated by ribs 62, and reaction vessel cylinder 20. Barrier 26 is shown in partial cutaway to reveal the upper tapered portion of cylinder 20, wherein reactant compartment 22 exists. Pin 42 is also shown.

With reference to FIG. 2, operation of the heat transfer container of the present invention is initiated in reaction vessel 18 containing the appropriate reagents 30 and 32 by manual external pressure on the flexible convex outer surface of container bottom 40. This action moves pin 42 upward to break barrier 26, releasing the liquid reactant 30 into compartment 24. The desired reaction proceeds with heat transfer across cylinder 20 which beneficially has a large surface area with respect to product chamber 41. Similarly, the raised buttons 56 on cover 12 may be activated to release the desired additives into product chamber 41. Adhesive tab 59 will be removed to permit the product to be consumed or decanted. During use, insulating jacket 14 isolates container 10, including reaction vessel 18, from the atmosphere in order to preserve the adjusted temperature of chamber 41.

Referring to FIG. 6, an alternative embodiment of the heat transfer container of the present invention is designated 70. Heat transfer container 70 is structurally similar to container 10, however the liquid reactant is contained in balloon 72, an alternate form of barrier comprising a unitary isolated compartment. Manufacturing considerations may dictate which embodiment is employed.

The inventor has discovered that a heat transfer container as described herein is especially advantageous as it results from the inventive method of manufacture by which it is produced. The presently preferred method of manufacturing the container of the present invention involves a sequence of steps herein described with reference to FIGS. 2 and 4 and the preferred embodiment therein illustrated. Initially, product body 16 is provided with insulating jacket 14, attached as set forth above. PTFE coated aluminum cylinder 20 is then inserted into the body 16 through the upper end such that lip 38 meets the groove of rolled edge 34 of body 16. This attachment is thermally sealed. With the container in an inverted orientation, the liquid reactant is added to cylinder 20 followed by application of foil barrier 26 which is thermally sealed to cylinder 20 at surface 28. In the alternative, a penetrable balloon containing the liquid reactant may be substituted for the water and barrier attachment steps. On top of barrier 26, solid reactant 30 is then added to cylinder 20. Container bottom 40, including pin 42, is then sealed to cylinder 20 at surface 36. After bottom 40 is sealed, completing reaction vessel 18, the container is returned to an upright orientation so that a beverage or other product may be added to chamber 41 from above. The cover 12 is finally heat sealed to the product body 16 at shoulder 60. Alternatively, the cover may be attached prior to filling with product, the product being later added through the opening 48 in cover 12.

Based on the foregoing description, it will be apparent to those skilled in the art that the heat transfer container of the present invention has a structure lending itself to convenient, reliable operation and economical manufacture. Therefore, the container of the invention is viable as a disposable unit for beverages and other products. As will also be apparent to those skilled in the art, various modifications can be made within the scope of the herein described container and method of manufacture. Such modifications being within the ability of those skilled in the art form a part of the present invention and are embraced by the appended claims.

It is claimed:

1. A single use heat transfer container comprising:
   a generally tubular plastic body having a longitudinal axis, upper and lower ends and exterior and interior surfaces;
   an outer jacket surrounding and affixed to said plastic body;
   a conductive reaction vessel disposed within said plastic body, said vessel having a lower flange sealed to said plastic body interior surface and enclosing said lower end;
   a flexible vessel bottom enclosing said reaction vessel and a breakable barrier defining two compartments in said vessel;
   at least one pin integral to said vessel bottom and extending therefrom inside said vessel toward said barrier.

2. The container of claim 1, wherein said barrier comprises a liquid-filled balloon.

3. The container of claim 1, further comprising a container cover enclosing said upper end.

4. The container of claim 3, wherein said plastic body has an inwardly rolled edge at said lower end forming a base for said container and receiving said vessel lower flange.

5. The container of claim 4, wherein said vessel bottom is of plastic and is sealed to said lower flange.

6. The container of claim 5, wherein said barrier is affixed to said reaction vessel at an inner toroidal surface.

7. The container of claim 6, wherein said pin comprises a cylinder extending substantially parallel to said longitudinal axis.

8. The container of claim 7, wherein said jacket extends longitudinally along said plastic body without reaching said lower end.

9. The container of claim 1, wherein said cover is a dispensing cover comprising a top and a foil layer spaced apart by a rim and internal dividers on the interior of the top;
   said dividers defining a plurality of compartments and a cover opening in conjunction with said top and said foil layer;
   said top including a raised button each compartment with a vertical prong extending inside said compartment toward said foil.

10. The method of making a single use heat transfer container comprising:
    a generally tubular plastic body having a longitudinal axis, upper and lower ends and exterior and interior surfaces;
    an outer jacket surrounding and affixed to said plastic body;
    a conductive reaction vessel disposed within said plastic body, said vessel having a lower flange sealed to said plastic body inferior surface and enclosing said lower end;
    a flexible vessel bottom enclosing said reaction vessel and a breakable barrier defining two compartments in said vessel;
    at least one pin integral to said vessel bottom and extending therefrom inside said vessel toward said barrier;
    said method comprising the steps of:
    inserting said vessel into said plastic body and heat sealing said lower flange to said plastic body interior surface;
    adding an effective amount of a liquid reactant to said vessel;
    heat sealing said breakable barrier to said vessel above the liquid level to isolate said liquid reactant;
    adding a solid reactant to said vessel;
    heat sealing said vessel bottom to said vessel lower flange;
    inverting said container such that said upper end is oriented upward;
    filling said container with a product;
    heat sealing said cover to said upper end.

11. The method of making a single use heat transfer container comprising:
    a generally tubular plastic body having a longitudinal axis, upper and lower ends and exterior and interior surfaces;
    an outer jacket surrounding and affixed to said plastic body;
    a conductive reaction vessel disposed within said plastic body, said vessel having a lower flange sealed to said plastic body interior surface and enclosing said lower end;
    a flexible vessel bottom enclosing said reaction vessel and a breakable barrier defining two compartments in said vessel;
    at least one pin integral to said vessel bottom and extending therefrom inside said vessel toward said barrier, wherein said barrier comprises a liquid filled balloon;
    said method comprising the steps of:
    inserting said vessel into said plastic body and heat sealing said lower flange to said plastic body interior surface;
    adding a balloon containing a liquid reactant to said vessel;

adding a solid reactant to said vessel;

heat sealing said vessel bottom to said vessel lower flange;

inverting said container such that said upper end is oriented upward;

filling said container with a product;

heat sealing said cover to said upper end.

12. A single use heat transfer container comprising:

a generally tubular plastic body having a longitudinal axis, upper and lower ends, exterior and interior surfaces, and an inwardly rolled edge at said lower end forming a base for said container;

an outer jacket surrounding and affixed to said plastic body, said jacket extending longitudinally along said plastic body without reaching said lower end and including a plurality of longitudinally running ribs on its inner surface that contact said plastic body and maintain a gap between said jacket and said body;

a conductive reaction vessel disposed within said plastic body, said vessel having a lower flange received and sealed in said inwardly rolled edge of said plastic body and said vessel enclosing said lower end;

a flexible vessel bottom enclosing said reaction vessel and a breakable barrier defining two compartments in said vessel, wherein said vessel bottom is of plastic and is sealed to said lower flange and wherein said barrier is affixed to said reaction vessel at an inner toroidal surface;

at least one pin integral to said vessel bottom and extending therefrom inside said vessel toward said barrier, said pin comprising a cylinder extending substantially parallel to said longitudinal axis; and a container cover enclosing said upper end.

13. The container of claim 12, wherein said cover is a dispensing cover comprising a top and a foil layer spaced apart by a rim and internal dividers on the interior of the top;

said dividers defining a plurality of compartments and a cover opening in conjunction with said top and said foil layer;

said top including a raised button above each compartment with a vertical prong extending inside said compartment toward said foil.

14. The container of claim 13, wherein said reaction vessel comprises aluminum.

15. The container of claim 14, wherein said cover includes a raised outer lip.

16. The container of claim 15, wherein said opening is covered by a removable adhesive tab.

\* \* \* \* \*

UNITED STATES PATENT AND TRADEMARK OFFICE
CERTIFICATE OF CORRECTION

PATENT NO. : 6,338,252 B1
DATED : January 15, 2002
INVENTOR(S) : John P. Calderaio Page 1 of 1

It is certified that error appears in the above-identified patent and that said Letters Patent is hereby corrected as shown below:

Column 6,
Line 10, after "button" insert -- above --.

Signed and Sealed this

Fourteenth Day of May, 2002

Attest:

JAMES E. ROGAN
*Director of the United States Patent and Trademark Office*

*Attesting Officer*